(12) United States Patent
Siedenburg et al.

(10) Patent No.: US 8,929,177 B2
(45) Date of Patent: Jan. 6, 2015

(54) SYSTEM AND METHOD FOR PERFORMING PROGRESSIVE BEAMFORMING

(71) Applicant: FUJIFILM Sonosite, Inc., Bothell, WA (US)

(72) Inventors: Clinton T. Siedenburg, Everett, WA (US); Juin-Jet Hwang, Mercer Island, WA (US); Nikolaos Pagoulatos, Bothell, WA (US); Garet Nenninger, Lake Forest Park, WA (US)

(73) Assignee: FUJIFILM Sonosite, Inc., Bothell, WA (US)

( * ) Notice: Subject to any disclaimer, the term of this patent is extended or adjusted under 35 U.S.C. 154(b) by 76 days.

(21) Appl. No.: 13/831,436

(22) Filed: Mar. 14, 2013

(65) Prior Publication Data

US 2014/0269166 A1    Sep. 18, 2014

(51) Int. Cl.
*G01S 15/89*    (2006.01)
*G01S 15/02*    (2006.01)
*G10K 11/34*    (2006.01)
*G01S 7/52*    (2006.01)

(52) U.S. Cl.
CPC .................. *G01S 15/02* (2013.01); *G01S 15/89* (2013.01); *G10K 11/346* (2013.01); *G01S 15/8915* (2013.01); *G10K 2200/10* (2013.01); *G01S 7/5208* (2013.01)
USPC ........................................................ 367/138

(58) Field of Classification Search
None
See application file for complete search history.

(56) References Cited

U.S. PATENT DOCUMENTS

| | | | | |
|---|---|---|---|---|
| 3,877,031 A | * | 4/1975 | Mailloux et al. | 343/778 |
| 4,542,382 A | * | 9/1985 | Hol | 342/91 |
| 5,976,089 A | | 11/1999 | Clark | |
| 6,147,648 A | * | 11/2000 | Granholm et al. | 343/700 MS |
| 6,231,511 B1 | | 5/2001 | Bae | |
| 2003/0231125 A1 | | 12/2003 | Freeman et al. | |
| 2008/0092660 A1 | | 4/2008 | Hunt | |
| 2008/0158427 A1 | * | 7/2008 | Chiu | 348/625 |
| 2008/0260258 A1 | * | 10/2008 | Wang et al. | 382/199 |
| 2009/0187099 A1 | | 7/2009 | Burcher | |
| 2012/0142285 A1 | * | 6/2012 | Tsuchida et al. | 455/78 |

FOREIGN PATENT DOCUMENTS

JP    2004215987    8/2004

OTHER PUBLICATIONS

Orfanidis, Electromagnetic vawes and antennas, www.ece.rutgers.edu/~orfanidi/ewa, 2010, pp. 537.*

International Searching Authority, International Search Report and Written Opinion, PCT Application PCT/US2014/026843, mailed Jul. 11, 2014, 11 pages.

* cited by examiner

*Primary Examiner* — Luke Ratcliffe
*Assistant Examiner* — Hovhannes Baghdasaryan
(74) *Attorney, Agent, or Firm* — Perkins Coie LLP

(57) ABSTRACT

A progressive beamformer in an imaging system includes a number of stages. A first stage delays and combines a number of received data streams to align the streams to a point of interest on a first beamline. The first stage feeds a number of subsequent stages that operate to buffer and re-delay at least a portion of the data streams received from a previous stage in order to align the data streams to a point of interest on a new beamline. In one embodiment, each stage operates to reduce the number of data streams that are passed to a subsequent stage without suffering from grating lobes. A beam reclamation process includes a number of stages that receive data streams from end elements in order to produce reclaimed beams that are added to beamline produced in a mainline beamforming process in order to produce output beamlines.

17 Claims, 15 Drawing Sheets i) Grating Lobe Equation
The equation that describes this relationship is
$kd \cdot (\sin \theta_s - \sin \theta_p) = +/- 2\pi n$ Grating Lobe Cancellation (GLC)

SYSTEM AND METHOD FOR PERFORMING PROGRESSIVE BEAMFORMING

TECHNICAL FIELD

The disclosed technology relates generally to beamforming techniques and in particular to systems for beamforming in ultrasound imaging systems.

BACKGROUND

In ultrasound imaging systems, images of a tissue region are created by transmitting one or more acoustic pulses into the body from a transducer. Reflected echo signals that are created in response to the pulses are detected by the same or a different transducer. The echo signals cause the transducer elements to produce electronic signals that are analyzed by the ultrasound system in order to create a map of some characteristic of the echo signals such as their amplitude, power, phase or frequency shift etc. The map therefore can be displayed to a user as an image of the tissue.

Most imaging ultrasound transducers have a number of individual piezoelectric transducer elements that are typically arranged in a linear, curved, concentric or two-dimensional array. In some cases, the array may be one element wide such as 128×1 elements. In other cases, higher dimensional arrays such as 128×2, 128×4 . . . 128×128 elements are used.

In order to accurately determine a characteristic of an echo signal at a particular location or point of interest ("POI") in the body, the signals from multiple transducer elements are analyzed. However, the acoustic echo signals generated at any given POI reach each of the transducer elements at slightly different times. Therefore, the ultrasound system performs a task of beamforming that aligns the received echo signals from the various transducer elements so that the echo signals originating from the same POI can be analyzed. Beamforming typically involves storing the signals from each transducer element by at least an amount of time equal to the time it takes for an acoustic signal to reach the transducer elements that are the farthest from a POI. Some systems store signals from an entire region of interest. The stored signals from a number of the transducer elements are then delayed, aligned, weighted and combined to determine a characteristic of an echo signal at a particular POI.

Beamforming is generally the most computationally intensive task that is performed by programmable or special purpose processors (e.g. DSPs) within an imaging system. The beamforming process therefore contributes significantly to the processing time required to produce images of tissue in the body. The overhead increases the time required to produce images as well as the cost and complexity of the processing components of the imaging system and the electrical power required to run those components.

SUMMARY

A progressive beamforming system includes a series of stages including a first stage and a number of subsequent stages. In the first stage, a data stream is received from transducer elements that represent signals from a field of view. The data stream samples are delayed to align the data stream to a point of interest on a first beamline. A weighted combination of the data stream samples is generated to reduce a number of elements in the data stream. In a subsequent processing stage, the data streams from the previous stage are received and re-delayed to align the data stream to a second point of interest on a second beamline. Weighted combinations of the re-delayed elements are then combined to further reduce the number of elements.

DETAILED DESCRIPTION

The technology disclosed herein relates to improvements in beamforming. Although the technology is described with respect to its use with ultrasound imaging systems, it will be appreciated that the technology can also be used in other imaging systems such as sonar, radar, non-destructive test, MRI, acoustics, astronomy or in other environments where mechanical, electrical or electromagnetic wave signals are transmitted into a region of interest and information is gathered in response to the signals. For example, photo-acoustic imaging is a technique where laser light is transmitted into a body or other object and acoustic signals are created due to the differential heating of the tissue/object. The differential heating produces acoustic signals that can be detected and beamformed in accordance with the disclosed technology.

As discussed above, conventional beamforming is a process whereby samples from a number of transducer elements are stored and aligned so that samples reflecting echoes that originate from the same location or POI in a body can be combined in order to produce an image of a tissue characteristic at that particular location.

Figure 1:
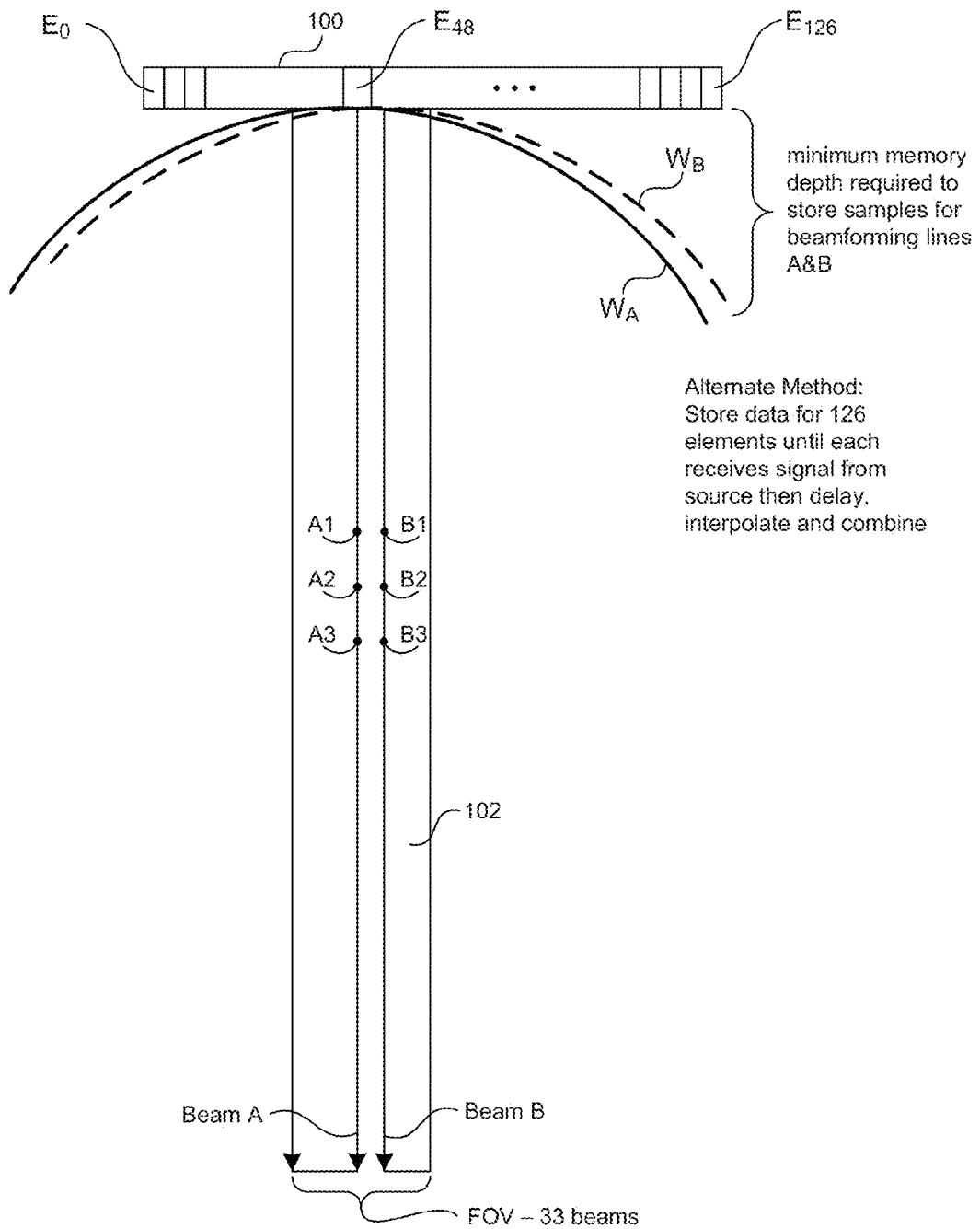
FIG. 1 illustrates a conventional method of beamforming in an ultrasound imaging system.

FIG. 1 illustrates a conventional beamforming system whereby acoustic pulses are delivered into a tissue sample from an ultrasound transducer 100. In the example shown, the transducer 100 has a linear array of 127 transducer elements $E_0$-$E_{126}$. However, it will be appreciated that other transducer sizes or shapes such as convex, concentric or two-dimensional arrays could be used.

Many ultrasound systems create an image of a tissue region using multiple field of views (FOVs) or slices of the region. Depending on the shape of the transducer, the FOV may be rectangular or arcuate in shape. The beamforming is performed by storing and combining data streams to produce a value for an echo signal characteristic at a number of positions on individual beamlines within each FOV. Echo signals from all or a subset of the transducer elements are analyzed to determine the echo characteristic (amplitude, power, phase-shift etc.) at a number of locations along each beamline. For example, a beamline A includes a number of POIs A1, A2, A3, while a beamline B includes a number of POIs B1, B2, and B3. In the example shown, the FOV includes 33 beamlines; however only two beamlines, beamline A and beamline B, are identified.

In the example shown, an echo signal originating from the POI A1 expands outward as a spherical wave $W_A$. The relative location of the transducer elements and the POI A1 means that wave $W_A$ encounters the closest transducer elements such as element $E_{48}$ before the wave encounters transducer element $E_{126}$ at the end of the array. To align the signals for the POI A1, a stream of samples from the transducer elements are stored for at least a period equal to the difference in time between when the echo signals reach the closest elements (e.g., element $E_{48}$ for the example wave $W_A$ described above) and when the same wave reaches the farthest transducer elements in the transducer (e.g., element $E_{126}$ for the example wave $W_A$ described above). In addition, a digital filter is typically used to interpolate between the digital samples during the beamforming process. The interpolated samples from each of the transducer elements are aligned, weighted and combined to produce a value for the echo signal at the POI A1. The process is repeated for the next POI A2 on the beamline until data for the entire beamline is computed.

Most modern ultrasound systems perform parallel beamforming where data for a number of beamlines in a FOV are simultaneously calculated. In the example shown in FIG. 1, data for the beamlines A and B are simultaneously calculated. To calculate the data for the beamline B, digital samples from each of the transducer elements are read from memory, aligned and summed in the same manner as beamline A. Because the delays associated with a spherical wave A that originates from POI A1 on beamline A and a spherical wave B that originates from POI B on beamline B are nearly identical, virtually the same calculations are simultaneously performed to compute the data for each beamline. The data for sets of beamlines within a FOV are typically stored until all the data for all the beamlines in each of the FOVs have been computed, at which time an image can be created and displayed.

The technology disclosed herein decreases the number of nearly repetitive calculations that are performed when calculating data for a number of beamlines in a FOV by taking advantage of the closely related delays used to create data for a beamline. To reduce the number of delay and summing operations required to perform simultaneous beamforming, the disclosed technology re-delays and re-combines samples from transducer elements in various stages order to calculate the data for another beamline within a FOV.

Figure 2:
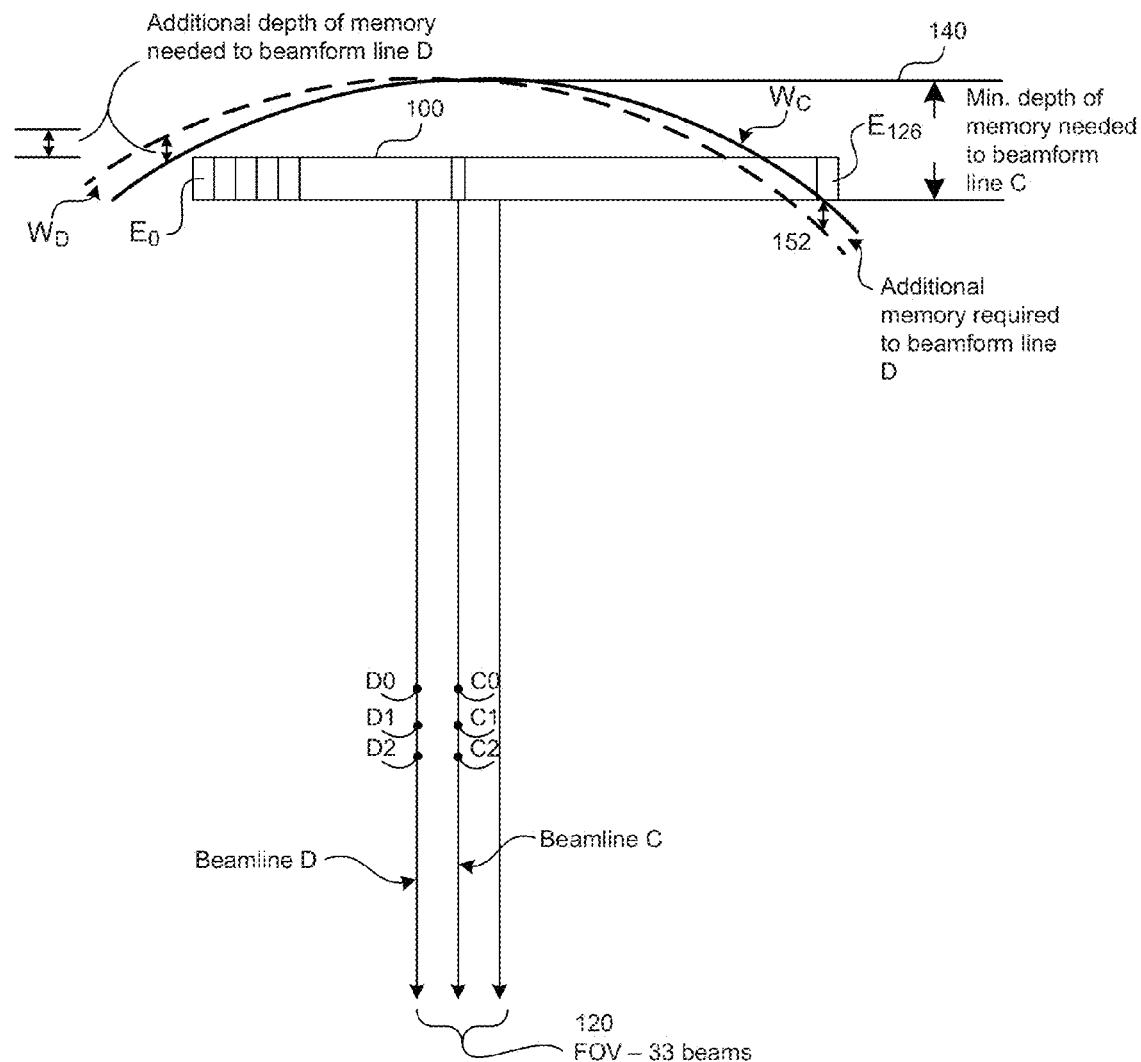
FIG. 2 illustrates a method of progressive beamforming ("PBF") in accordance with an embodiment of the disclosed technology.

As illustrated in FIG. 2, one embodiment of the disclosed technology also employs the linear ultrasound transducer 100 that includes 127 transducer elements $E_0$-$E_{126}$. Acoustic echo signals that are received by the transducer elements create corresponding electrical signals, which are digitized by an analog-to-digital converter for temporary buffering in a digital memory and analysis by a processor (not shown). FIG. 2 illustrates a FOV 120 that includes 33 beamlines including a central beamline C, located in the center of the FOV 120 and that includes POIs C0, C1, C2, C3 etc. Similarly, beamline D at an edge of the FOV 120 includes POIs D0, D1, D2, D3 etc. Echo signals originating from the POI C0 on beamline C expand out as a spherical wavefront $W_C$. As will be appreciated, the wavefront $W_C$ reaches the farthest transducer elements, such as element $E_{126}$, after the wavefront reaches the closer transducer elements such as element $E_{48}$. To align the signals for calculating the data for the POI's on beamline C, the digital samples are delayed in a memory having at least a depth or size sufficient to store samples for a time that is represented by the bracket 140 to support alignment from all contributing elements.

In contrast to repeating nearly the same delay calculations to determine data for points on each beamline, the disclosed technology operates to buffer and re-delay a portion of the signals that were used to calculate the data for the points on first beamline in order to calculate the data for points on additional beamlines. In the example shown, samples representing the echo signals that originate from POIs D0, D1, D2, D3 on beamline D are calculated by re-delaying a portion of the digital signals stored to calculate the data for the POIs on beamline C. The wavefronts of waves $W_D$ originating from POIs D0-D3 arrive at the transducer elements at times that are only slightly different than the wavefronts of waves $W_C$ originating from POIs C0-C3. Therefore the data for the POIs on beamline D can be calculated by buffering and re-aligning digitized echo signals that are close in time to the samples that were used in calculating the data for points on beamline C. In the example shown, the wavefront $W_D$ (shown in dashed lines) reaches the left-most transducer element $E_0$ before the wavefront $W_C$ originating from a point on beamline C. Therefore, data from the elements is buffered in a memory buffer having a depth at least as long as this time difference and the samples that arrive before the wavefront $W_C$ can be used to compute the data for beamline D. On the other side of the transducer, the wavefront $W_D$ arrives at transducer element $E_{126}$ after the wavefront $W_C$. Therefore data is buffered in a memory having a depth 152, which is at least at long as this time difference. Samples arriving after the wavefont $W_C$ has passed are used to produce the data for POIs on the beamline D.

As will be appreciated, the closer the beamlines are in the FOV, the less time difference occurs between the time at which the wavefronts arrive at the various transducer elements and correspondingly less memory is required to buffer the digitized echo signals in order to align the data for the POIs on another beamline. Because the time difference is short, significantly less buffer memory is needed than that needed to align the wave fronts for points originating on beamline C.

As will be explained in further detail below, one embodiment of the disclosed technology operates to calculate the data for a number of beamlines in stages. For the various stages, a portion of the data streams used to calculate data for a beamline in a previous stage are buffered and re-delayed to calculate the data for a new beamline. In one embodiment, the number of transducer elements is reduced after each stage by combining the data streams from selected transducer elements. The result is a beamforming system that simultaneously increases the number of beamlines at each stage and reduces the number of data streams from transducer elements to be analyzed.

Figure 3:
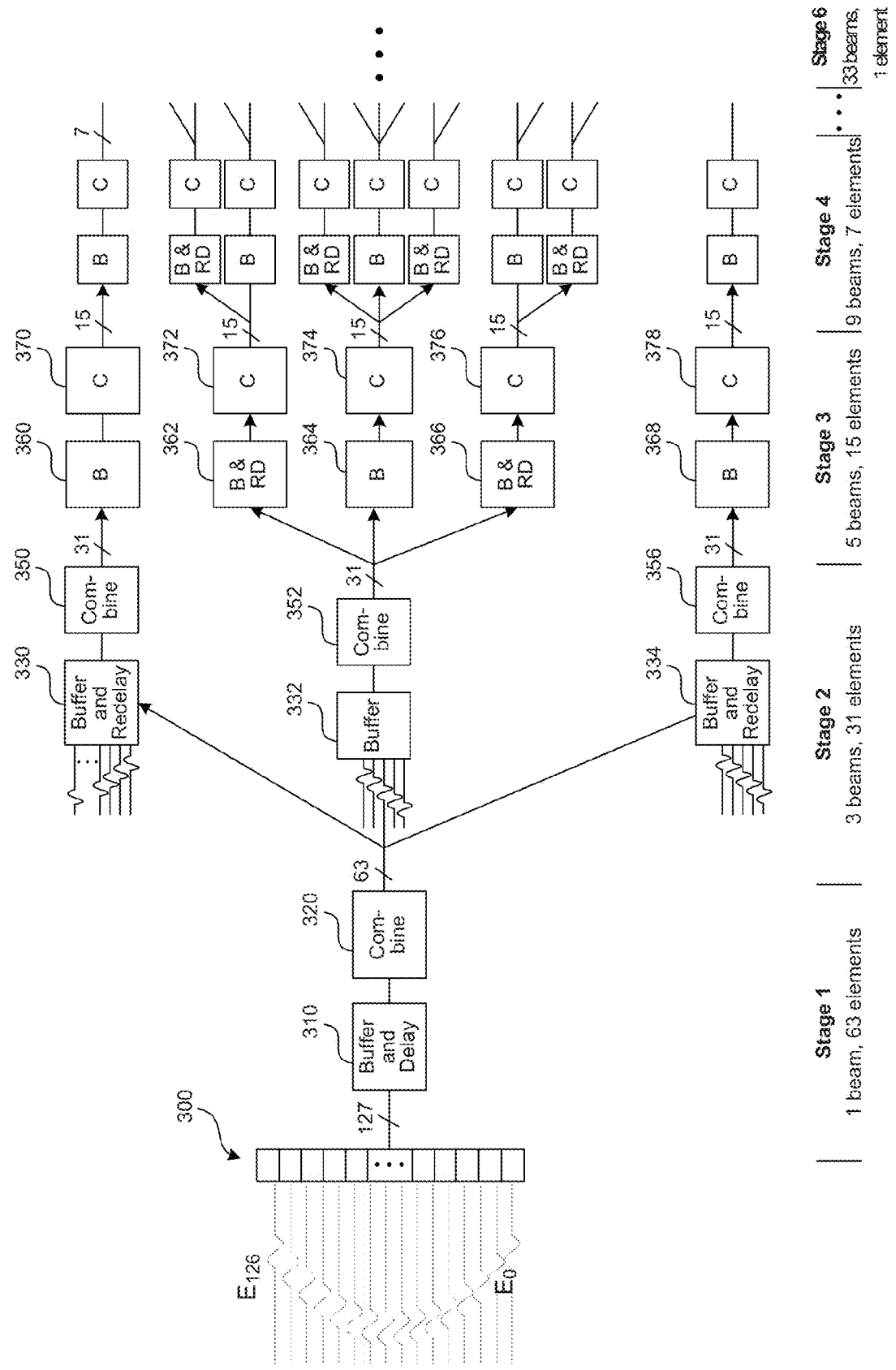
FIG. 3 is a block diagram showing the functional components of a progressive beamformer with digital stacking ("DS") in accordance with an embodiment of the disclosed technology.

FIG. 3 illustrates a functional block diagram of a beamforming system in accordance with one embodiment of the disclosed technology. In the embodiment shown, a portion of the data streams from the elements of the transducer are first buffered and delayed to calculate data for a POI on a center beamline. A portion of the data streams used to compute the POI's in the first computed beamline are then buffered and re-delayed in order to produce data for additional beamlines. This process repeats in subsequent stages by buffering the data streams from a previous stage and re-delaying the buffered streams in order to calculate data for additional beamlines that lie between the previously calculated beamlines.

In one embodiment, the number of data streams analyzed in each stage of the beamformer is reduced by combining data from adjacent streams. For example, the data streams from nine transducer elements $E_0$-$E_8$ can be combined using a weighted sum of adjacent streams such as ($E_0+2\times E_1+E_2$; $E_2+2\times E_3+E_4$; $E_4+2\times E_5+E_6$; $E_6+2\times E_7+E_8$.) in order to reduce the nine streams to four. By combining streams, the transducer elements are effectively increased in size to create "super elements" or ("SE"). The next stage in the progressive beamformer operates to buffer and re-delay the data streams from these combined streams to produce data for additional beamlines and reduce the number of data streams from transducer elements that are again effectively doubled in size. The streams from these combined streams are then buffered and re-delayed in a subsequent stage to create the data for additional beamlines and so on such that each stage fills in data for points on beamlines that lie between the previously calculated beamlines until the data for all the desired beamlines in the FOV are calculated.

The progressive beamforming uses significantly fewer delay calculations than the prior art methods. The table set forth below, shows the savings in the number of delay blocks used to produce 33 beam lines.

In the embodiment shown in FIG. 3, an ultrasound transducer 300 includes a number (e.g. 127) of active transducer elements. Each of the transducer elements produces a corresponding stream of digital data in response to received echo signals. In a first stage, the data streams from each of the 127 transducer elements are stored in a buffer 310. In one embodiment, the buffer 310 has a depth (i.e. size) sufficient to store the samples produced during a time period that is equal to the time difference between when the wavefronts from a POI arrive at the closest transducer elements in an array and the time at which the wavefronts reach the farthest transducer elements in the array. Once the wavefronts from the POI have been received by each of the transducer elements, the buffered data are aligned to produce the data for a POI on a first beamline. In the embodiment shown, the first beamline is in the center of the field of view. However this is not required.

To calculate the data for the POIs on the first beamline, the streams pass through a buffer and are delayed at 310 in order to focus the buffered data at a point on a first beamline. The buffer may include a multi-tap filter used to interpolate data between sample points. The buffer and filter can be implemented as a FIFO memory. In one embodiment, the data streams from neighboring transducer elements are weighted and combined by a programmed processor, DSP or ASIC or other electronic circuit at 320 to reduce the number of data streams by a factor of two as indicated above.

In the second stage of the progressive beamformer, a portion of the resulting 63 data streams are then buffered at 330, 332, 334. To focus the data on the two outer-most beamlines, the data buffered at 330 and 334 are re-delayed. The data buffered at 332 is already focused at a point along the center beamline and the buffer is only used so that the data from the three beamlines is produced simultaneously. The 63 data streams used to produce the data for POIs on the three beamlines in stage 2 are then weighed and combined at 350, 352 and 356 to reduce the number of data streams by a factor of two and to increase the effective element size. At the end of stage 2, there are data for 3 beams from 31 elements of effective size 4.

In stage three, a portion of the 31 data streams are then buffered at 360, 362, 364, 366 and 368. The data for the center and outer-most beamlines are already focused and therefore no re-delays are needed for these buffered data streams. These data streams are weighted and combined to reduce the number of data streams and to increase the effective element size via combining blocks 370, 374 and 378. The data buffered at 362 and 366 is re-delayed to focus the data streams on points on the new beamlines that are positioned between the center beamline and the two outer-most beamlines and then weighted and combined to reduce the number of data streams and to increase the effective element size at blocks 376, 372.

| Delayed Elements | Number of Output Super Elements | Output Super Element Size | Output Additional Beams | Total Output Beams | PBF Total Delay Blocks | Cumulative Output Delay Blocks | Prior Art Multi-Line Delay Blocks |
|---|---|---|---|---|---|---|---|
| 127 | 63 | 2 | 1 | 1 | 127 | 127 | 127 |
| 63 | 31 | 4 | 2 | 3 | 126 | 253 | 381 |
| 31 | 15 | 8 | 2 | 5 | 62 | 315 | 635 |
| 15 | 7 | 16 | 4 | 9 | 60 | 375 | 1143 |
| 7 | 3 | 32 | 8 | 17 | 56 | 431 | 2159 |
| 3 | 1 | 64 | 16 | 33 | 48 | 479 | 4191 |

After stage 3 in the progressive beamformer, data are computed for points on 4 new beamlines from 15 data streams each with an effective element size of 8.

Processing continues in this manner by buffering a portion of the data streams from a previous stage and re-delaying the buffered data streams as necessary to focus the buffered data on a new beamline. In addition, each stage reduces the number of data streams and increases the effective element size.

In the exemplary embodiment shown, stage 4 of the progressive beamformer produces data for points on 9 beamlines represented by 7 data streams each having an effective element size of 16. In stage five, data are computed for points on 17 beamlines represented by 3 data streams each having an effective element size of 32. Processing continues in this manner until there are 33 beamlines (or however many are required) represented by a single data stream (or however many are required) with an effective element size of 64 (or however many are required).

In one embodiment, once the original data streams fill the buffer at 310, then for each additional set of samples received in the 128 data streams produced from the transducer, data for the next depth POI in all 33 beamlines are output in parallel at the end of the progressive beamformer stages.

As will be explained in further detail below, the contribution from the end data streams of the transducer are diminished as a result of the way in which the data streams are combined. Therefore the data for the outermost data streams each stage is reclaimed and added back into the final result of the progressive beamforming process. For purposes of illustration the process shown in FIG. 3 can be referred to as the "primary" or "mainline" beamforming process and adding back the data from the outermost data streams is called the "aperture reclamation" process.

Beamlines for a new FOV can then be created by repeating the above steps until the echo signals for an entire tissue area or region of interest have been processed and an image can be produced from the beamlines in a conventional manner.

As will be appreciated by those skilled in the art, beam patterns consist of a main lobe, a region of side lobes, and possibly grating lobes. The main lobe is in essence the beam. Practically, it is the most sensitive part of the beam pattern as it is the point to which all the delays are referenced. Its width is inversely related to the size of the sensing array. Side lobes are unwanted sensitivity to sources at other points in space. Side lobes are controlled by applying various weighting functions to the elements before summation in a procedure referred to as "apodization.". Typically, functions that decrease gracefully toward zero provide lower side lobe levels usually at the expense of the main lobe width. Grating lobes are a spatial alias of the main lobe and pose significant problems for any beamformer. They only occur when the field is too sparsely sampled. That is, at any particular frequency, if the element centers are spaced far enough apart, the phasing across the array from a source in one location is indistinguishable from a source in another location. The weighting function applied to the aperture to control side lobes cannot reduce the grating lobe, but rather, widens it as it does also the main lobe.

Figures 4A, 4B:
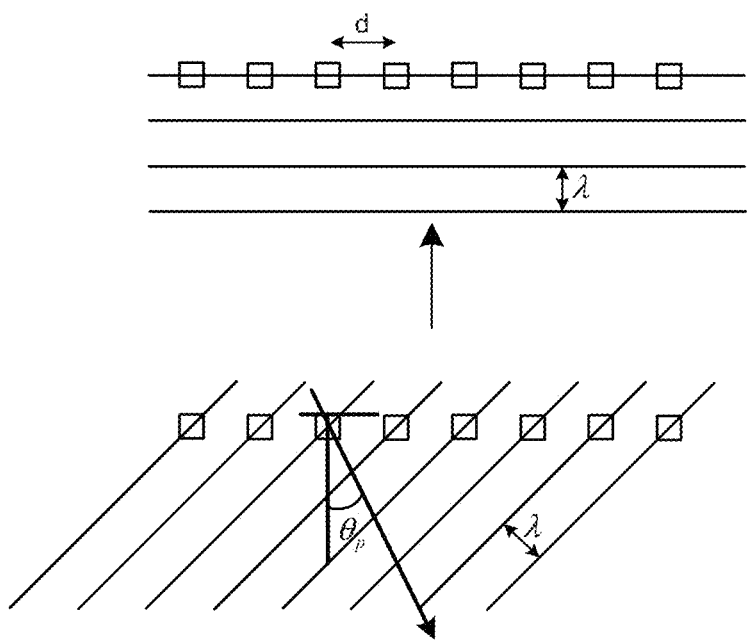
FIGS. 4A and 4B illustrate how a grating lobe can be created based on the spacing of transducer elements and the frequency of received signals.

For a plane wave impinging upon a linear array, the grating lobe occurrence is well understood. As can be seen in FIG. 4A, when a continuous plane wave (depicted by the constant phase lines) is broad side to a linear array, the signal at each of the elements (boxes) is the same. When the plane wave comes from a different direction, $\theta$, then there is a point at which the phases appear from the element signal perspective to be at the same phase albeit from different cycles as shown in FIG. 4B.

Figure 5:
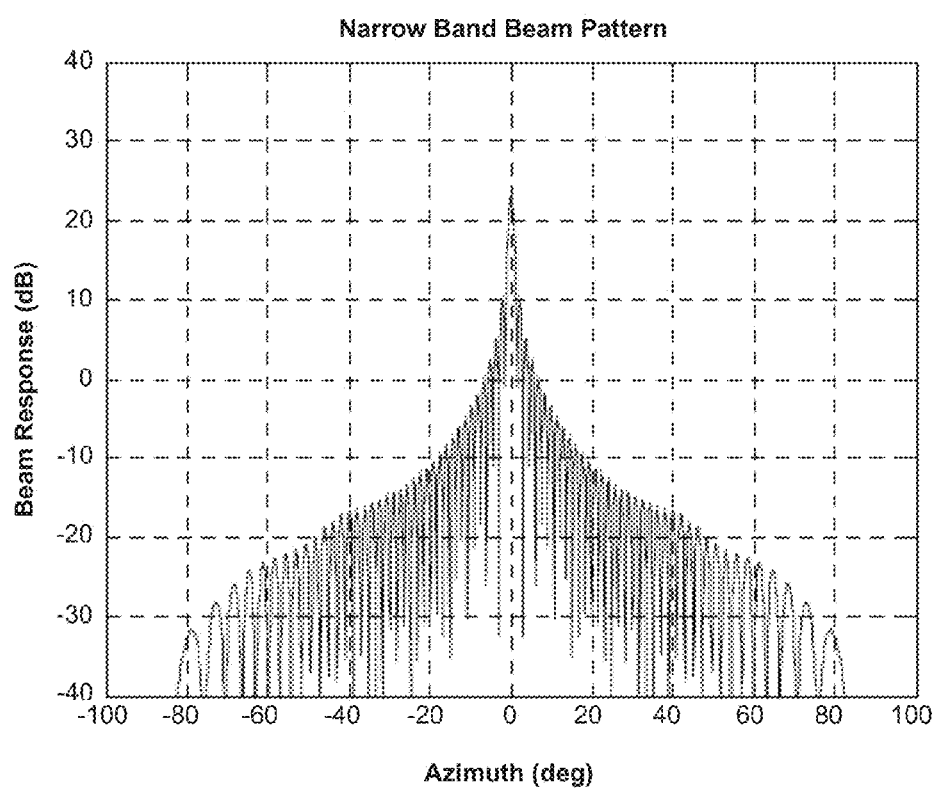
FIG. 5 illustrates a narrow band beam pattern with no significant grating lobes.

This is the grating lobe caused where the incident energy goes through some integer multiple of $2\pi$ between elements. When elements are spaced less than $kd \cdot \sin(\theta_s) = +/- 2\pi n$, where $k = 2\pi/\lambda$, d is the spacing between element centers and $\theta_s$ is the angle with respect to the perpendicular of the transducer array, it is apparent that grating lobes are impossible since there is no solution for integer n as shown in FIG. 5. When elements are delayed to form a beam along the angle $\theta_p$ then the grating lobe relationship is $kd \cdot (\sin \theta_s - \sin \theta_p) = +/- 2\pi n$. Many grating lobes can occur for a spacing that is sparser.

For completeness, it should be noted that whereas the main lobe position is constant over frequency, the grating lobe moves as its position is dependent on frequency. Thus, broad band grating lobes do not appear as severe as narrow band ones. The grating lobe strength is usually less than the main beam as it is modulated by the element pattern.

Figure 6:
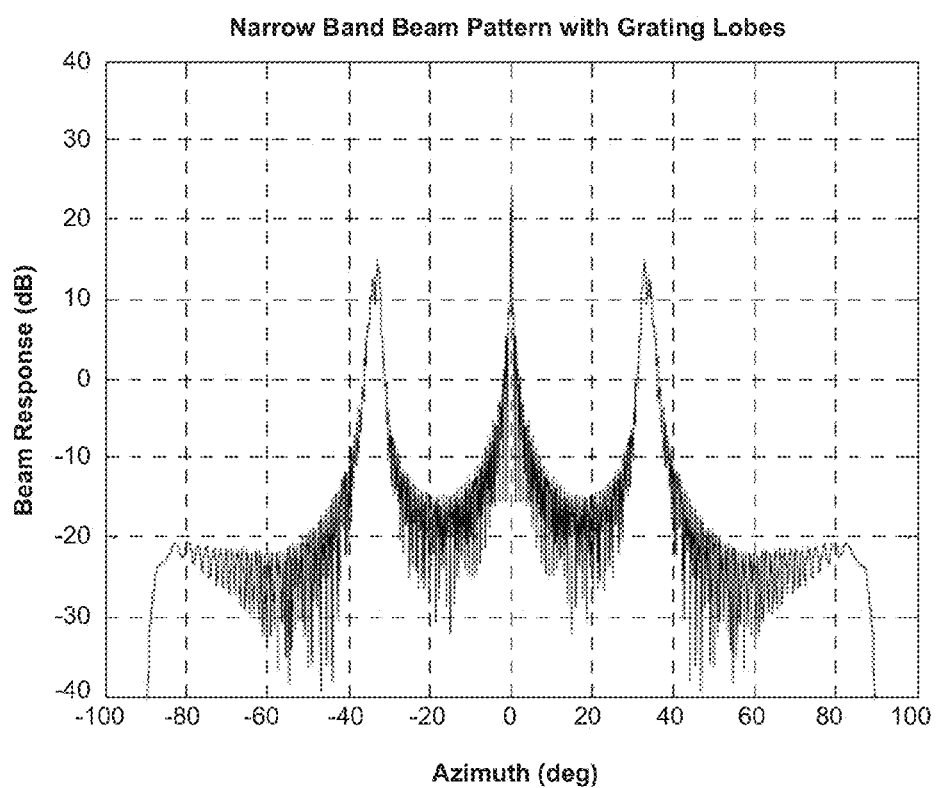
FIG. 6 illustrates a narrow band beam pattern with significant grating lobes.

The progressive beamforming technique described herein is filled with delays applied to elements or super elements which have spacing much greater than the half wavelength as noted above. Thus, grating lobes are to be expected. Whereas random beamforming errors give rise to random side lobe variations, progressive beamforming delay errors are periodic which gives rise to structure in the beam pattern. FIG. 6 illustrates an example of a narrow band beam pattern with grating lobes.

Figure 7:
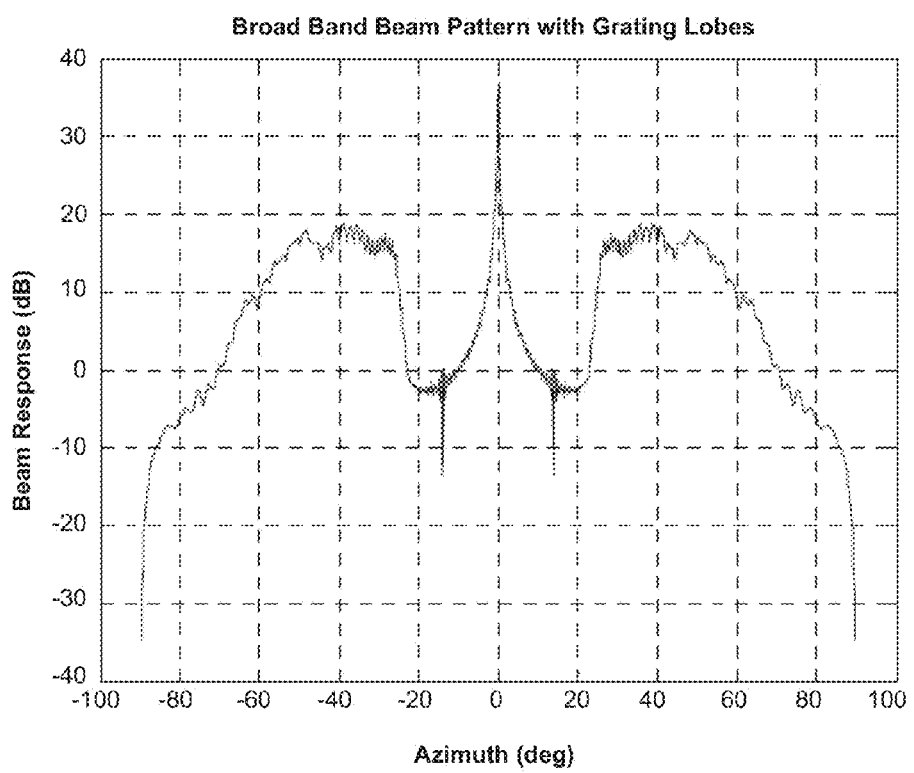
FIG. 7 illustrates a broadband beam pattern with significant grating lobes.

FIG. 7 shows a broad band grating lobe. Note that the broad band spectrum smears the grating lobe position.

By a very simple operation called digital stacking ("DS") at each progressive beamforming stage, these unwanted grating lobes may be substantially reduced or eliminated assuming that the original element spacing (pitch) is smaller than a half wavelength. In one embodiment, this is accomplished by summing three adjacent elements with a 1-2-1 proportioned weighting instead of simply summing pairs of elements with a 1-1 proportioned weighting. This can be seen by the following derivation.

Grating lobes occur in the far field whenever the angle of the plane wavefront and beamforming delays meet the relationship of $$kD(\sin \theta_s - \sin \theta_p) = \pm 2\pi n$$

where $\theta_s$ is the direction of the acoustic source, $\theta_p$, is the pointing direction of the beam, D is the spacing between the array elements, and k is the wave number $2\pi/\lambda$. Expressing the spacing in wavelengths gives $$\frac{D}{\lambda}(\sin \theta_s - \sin \theta_p) = \pm n$$

When $D < \lambda/2$, there is no chance of grating lobes. D can be larger so long as source and pointing directions are not severe. When D is large compared to a wave length, then many grating lobes can exist.

Consider when three adjacent elements are summed with a 1-2-1 weighting to form a larger element. Assume two adjacent elements are summed and without loss of generality reference the phase to the first one:

$$e_{12} = 1 + e^{jkd(\sin \theta_s - \sin \theta_p)}$$

where $\theta_s$ is the direction of the acoustic source, $\theta_p$ is the direction of the beam, d is the spacing between elements, and k is the wave number $2\pi/\lambda$. The sum of the second and third elements is:

$$e_{23} = e^{jkd(\sin \theta_s - \sin \theta_p)} + e^{j2kd(\sin \theta_s - \theta_p)}$$

Summing these two pairs together gives $$e_{12}+e_{23}=1+2e^{jkd(\sin\theta_s-\sin\theta_p)}+e^{j2kd(\sin\theta_s-\sin\theta_p)}$$

which can be reduced to the following form:

$$e_{12}+e_{23}=2e^{jkd(\sin\theta_s-\sin\theta_p)}\left[1+\frac{e^{-jkd(\sin\theta_s-\sin\theta_p)}+e^{jkd(\sin\theta_s-\sin\theta_p)}}{2}\right]$$

$$e_{12}+e_{23}=2e^{jkd(\sin\theta_s-\sin\theta_p)}[1+\cos(kd(\sin\theta_s-\sin\theta_p))]$$

$$e_{12}+e_{23}=4e^{jkd(\sin\theta_s-\sin\theta_p)}\cos^2\left(\frac{kd}{2}(\sin\theta_s-\sin\theta_p)\right)$$

Note that this equation is a zero when the cosine argument is zero, namely when $$\frac{kd}{2}(\sin\theta_s-\sin\theta_p)=\pm m\frac{\pi}{2};\ m\ \text{odd}$$

or expressing element spacing in terms of wave lengths, $$\frac{2d}{\lambda}(\sin\theta_s-\sin\theta_p)=\pm m\frac{\pi}{2};\ m\ \text{odd}$$

As can be easily seen, when D of the grating lobe equation is 2d of the zeros of the 1-2-1 weighting equation, the 1-2-1 weighting provides two zeros at exactly the location the grating lobe occurs when n and m are both unity. That is, when adjacent elements spaced d center-to-center are summed in a 1-2-1 fashion to form about half the number of elements spaced 2d center-to-center, the grating lobes created by the summing and decimation process are cancelled. And this is true at every frequency simultaneously.

It should also be noted that when the original pitch precludes the presence of grating lobes, then summing these elements in a 1-2-1 fashion and decimating by two will result in elements that are twice as large, element centers spaced twice as far apart, and have no grating lobes. This summation and decimation can continue in stages to produce increasingly fewer and larger elements that have no grating lobes at all frequencies.

Because grating lobes occur at every integer n and zeros only occur at odd integer m, it is easiest to create and remove just the first grating lobe at a time in stages. If two grating lobes are created larger decimations such as by three instead of two, two grating lobes may be created. For example, if $D<1.5\lambda$, then $$3/2(\sin\theta_s-\sin\theta_p)<\pm n$$

which means n could be either 1 or 2 depending on the differences between sine functions of the source and steering directions being $\pm 2/3$ or $\pm 4/3$. In this case, the weighting function would have to produce two sets of zeros, one set for each of the grating lobes. That is, m would have to take on two odd values such as 1 and 3 for the same value of d or two values of d for one value of m. For example, $$\frac{2d}{\lambda}\left(\frac{2}{3}\right)=\pm m_1$$

$$\frac{2d}{\lambda}\left(\frac{4}{3}\right)=\pm m_2$$

where $m_1$ and $m_2$ must be odd. Since the left hand sides are related by a factor of two, this cannot be accomplished. Clearly only odd grating lobes can be removed by a single value of d. For example, if $D=1.5\lambda$, then the first and third (at +/−90 degrees) grating lobes would be cancelled but not the second.

If, however, a second element spacing could be accommodated because different elements can be created by different groupings of sub elements, then with one value of m equating the two equations $$\frac{2d_1}{\lambda}\left(\frac{2}{3}\right)=\pm m$$

$$\frac{2d_2}{\lambda}\left(\frac{4}{3}\right)=\pm m$$

gives $$d_1=2d_2$$

For m=1, $d_1$ would need to be $3/4\lambda$, and $d_2$ would need to be $3/8\lambda$ indicating the need for even smaller sub element spacing to create a $d_2$ pitch related to the higher valued grating lobe. Clearly, other values of m could be used with other element pitches.

As D increases in wave lengths, n takes on numerous contiguous integer values according to $$\frac{D}{\lambda}(\sin\theta_s-\sin\theta_p)=\pm n$$

that is n=1, 2, 3, 4, When D=2d, only the odd numbered grating lobes (n=1, 3, 5, . . . ) are mitigated leaving all the even numbered ones unaffected according to $$\frac{2d_1}{\lambda}(\sin\theta_s-\sin\theta_p)=\pm m;\ m\ \text{odd}$$

However, if another array is created with $d_2=\frac{1}{2}d_1$, then the grating lobes of n=2, 6, 10, 14, . . . can be mitigated by $$\frac{2d_2}{\lambda}(\sin\theta_s-\sin\theta_p)=\pm m;\ m\ \text{odd}$$

In this way, grating lobes of n=1, 2, 3 can be mitigated allowing D to be as large as $3/2\lambda$. Creating another array of elements spaced $d_3=\frac{1}{2}d_2=\frac{1}{4}d_1$, then the grating lobes of n=4, 12, 20, 28, . . . can be mitigated by $$\frac{2d_3}{\lambda}(\sin\theta_s-\sin\theta_p)=\pm m;\ m\ \text{odd}$$

In this way, grating lobes of n=1, 2, 3, 4, 5, 6, 7 can be mitigated allowing D to be as large as $7/2\lambda$.

Continuing on in the same fashion, $d_4=\frac{1}{2}d_3=\frac{1}{4}d_2=\frac{1}{8}d_1$ accommodates grating lobe number from 1 to 15 and D to be as large as $15/2\lambda$.

In general, larger groupings of sub elements forming larger super elements requires a larger number of co-located arrays of smaller pitches. For N−1 contiguous grating lobes to be suppressed, $\log_2 N$ arrays are needed with pitches that correspond to $\lambda/(2*\log_2 N)$. In order to take advantage of these arrays, one would have to combine them in a way that has the effect of multiple zeros of the $\cos^2$ function of the 1-2-1 weighting combine as factors.

For example, one would desire a weighting operation for $D=\lambda$ that would result in cosine factors that mitigate the two grating lobes corresponding to n=1 and 2. That is, a pair of zeros are desired corresponding to $d_1$ and $d_2=\frac{1}{2}d_1$. Thus, it is desired to have $$\cos^2\left(\frac{kd}{2}(\sin\theta_s - \sin\theta_p)\right)\cos^2\left(\frac{kd}{4}(\sin\theta_s - \sin\theta_p)\right)$$

$$\frac{1+\cos(kd(\sin\theta_s - \sin\theta_p))}{2} * \frac{1+\cos\left(\frac{kd}{2}(\sin\theta_s - \sin\theta_p)\right)}{2}$$

$$\frac{1}{4}\left[1 + \frac{e^{jkd(\sin\theta_s-\sin\theta_p)} + e^{-jkd(\sin\theta_s-\sin\theta_p)}}{2}\right]$$

$$\left[1 + \frac{e^{j\frac{kd}{2}(\sin\theta_s-\sin\theta_p)} + e^{-j\frac{kd}{2}(\sin\theta_s-\sin\theta_p)}}{2}\right]$$

$$\frac{e^{-j\frac{3kd}{2}\sin\alpha}1}{16}$$

$$\left\{1 + 2e^{j\frac{kd}{2}\alpha} + 3e^{jdk\alpha} + 4e^{j\frac{3kd}{2}\alpha} + 3e^{j2kd\alpha} + 2e^{j\frac{5kd}{2}\alpha} + e^{j3kd\alpha}\right\}$$

where $\alpha$ is $\sin\theta_s - \sin\theta_p$. As can be easily seen, this is a 1-2-3-4-3-2-1 weighting scheme on an array with access to more finely spaced elements. In terms of the foregoing discussion, two collocated arrays with elements on different phase centers are used. A 1-3-3-1 weighting for the elements on integer phase centers is added to a 2-4-2 weighting for the elements on half integer phase centers. Clearly, larger elements with centers spaced at larger D can be similarly created with more factors.

It should also be noted that wider nulls (i.e. more zeros) at the grating lobes can be simply accommodated. Instead of a 1-2-1 digital stacking technique that leads to a pair of zeros, one can derive coefficients that correspond to four zeros as follows $$\cos^4\left(\frac{kd}{2}(\sin\theta_s - \sin\theta_p)\right)$$

$$\cos^2\left(\frac{kd}{2}(\sin\theta_s - \sin\theta_p)\right)\cos^2\left(\frac{kd}{2}(\sin\theta_s - \sin\theta_p)\right)$$

$$\frac{1+\cos(kd(\sin\theta_s - \sin\theta_p))}{2} * \frac{1+\cos(kd(\sin\theta_s - \sin\theta_p))}{2}$$

$$\frac{1}{4}\left[1 + \frac{e^{jkd(\sin\theta_s-\sin\theta_p)} + e^{-jkd(\sin\theta_s-\sin\theta_p)}}{2}\right]$$

$$\left[1 + \frac{e^{jkd(\sin\theta_s-\sin\theta_p)} + e^{-jkd(\sin\theta_s-\sin\theta_p)}}{2}\right]$$

$$\frac{e^{-j2kd\sin\alpha}1}{16}\{1 + 4e^{jkd\alpha} + 6e^{j2dk\alpha} + 4e^{j3kd\alpha} + e^{j4kd\alpha}\}$$

where $\alpha$ is $\sin\theta_s - \sin\theta_p$. Clearly, more zeros could be created with the same technique.

An alternative way to eliminate the even grating lobes is to use negative coefficients arising from the nulls imposed by the sine function. That is, a pair of zeros produced by a cosine function as previously shown for the odd grating lobes and a pair of zeros produced by a sine function shown below. Thus, it is desired to have $$\cos^2\left(\frac{kd}{2}(\sin\theta_s - \sin\theta_p)\right)\sin^2\left(\frac{kd}{2}(\sin\theta_s - \sin\theta_p)\right)$$

As shown before, the zeros of the first cosine factor occur at $$\frac{kd}{2}(\sin\theta_s - \sin\theta_p) = \pm m\frac{\pi}{2}; m \text{ odd}$$

$$2\frac{d}{\lambda}(\sin\theta_s - \sin\theta_p) = \pm m; m \text{ odd}$$

However, the zeros of the second sine factor occur at $$\frac{kd}{2}(\sin\theta_s - \sin\theta_p) = \pm m\frac{\pi}{2}; m \text{ even}$$

$$2\frac{d}{\lambda}(\sin\theta_s - \sin\theta_p) = \pm m; m \text{ even}$$

Comparing to the grating lobe equation $$\frac{d}{\lambda}(\sin\theta_s - \sin\theta_p) = \pm n$$

shows us that when D is large compared to $\lambda/2$, multiple grating lobes are created which are mitigated by elements that are half that size, the odd numbered ones by the cosine squared factor and the even numbered ones by the sine squared factor.

Continuing on with the coefficient generation, $$\frac{1+\cos(kd(\sin\theta_s - \sin\theta_p))}{2} * \frac{1-\cos(kd(\sin\theta_s - \sin\theta_p))}{2}$$

$$\frac{1}{4}\left[1 + \frac{e^{j(kd(\sin\theta_s-\sin\theta_p))} + e^{-j(kd(\sin\theta_s-\sin\theta_p))}}{2}\right]$$

$$\left[1 + \frac{e^{j(kd(\sin\theta_s-\sin\theta_p))} - e^{-j(kd(\sin\theta_s-\sin\theta_p))}}{2}\right]$$

Simplifying with the notation $\alpha=\sin\theta_s-\sin\theta_p$, and multiplying out the factors into terms yields $$\frac{1}{16}\{4+2e^{jkd\alpha}-2e^{-jkd\alpha}+2e^{jkd\alpha}+e^{j2kd\alpha}-1+2e^{-jkd\alpha}+1-e^{j2kd\alpha}\}$$

$$\frac{e^{j2kd\sin\alpha}}{16}\{-1 + 4e^{j2kd\alpha} + 4e^{j3kd\alpha} + e^{j4kd\alpha}\}$$

As can be easily seen, this is a $\{-1, 0, 4, 4, 1\}$ weighting scheme on an array with access to elements spaced half as far apart. Clearly, this allows use of element sizes of a much larger pitch.

Instead of two pairs of zeros, one zero from the cosine and one from the sine factor can be used. Thus, it is desired to have $$\cos\left(\frac{kd}{2}(\sin\theta_s - \sin\theta_p)\right)\sin\left(\frac{kd}{2}(\sin\theta_s - \sin\theta_p)\right)$$

Continuing on with the coefficient generation, $$\left[\frac{e^{jkd(\sin\theta_s - \sin\theta_p)} + e^{-jkd(\sin\theta_s - \sin\theta_p)}}{2}\right]\left[\frac{e^{jkd(\sin\theta_s - \sin\theta_p)} - e^{-jkd(\sin\theta_s - \sin\theta_p)}}{2i}\right]$$

Simplifying with the notation $\alpha = \sin\theta_s - \sin\theta_p$, and multiplying out the factors into terms yields $$\frac{1}{4j}\{e^{j2kd\alpha} - 1 + j - e^{-2jkd\alpha}\}$$

$$\frac{e^{-j2kd\alpha}}{4j}\{-1 - (1-j)e^{j2kd\alpha} + e^{j4kd\alpha}\}$$

As can be easily seen, this is a $\{-1, 0, j-1, 0, 1\}$ weighting scheme on an array with access to the naturally spaced elements. Since every other element weight is zero, then this can be performed as a complex interpolation at the larger element spacing, saving the need for generating delays. Clearly, grating lobes created by larger elements with centers spaced further apart can be mitigated albeit with more narrow nulls at the grating lobes.

Figure 8:
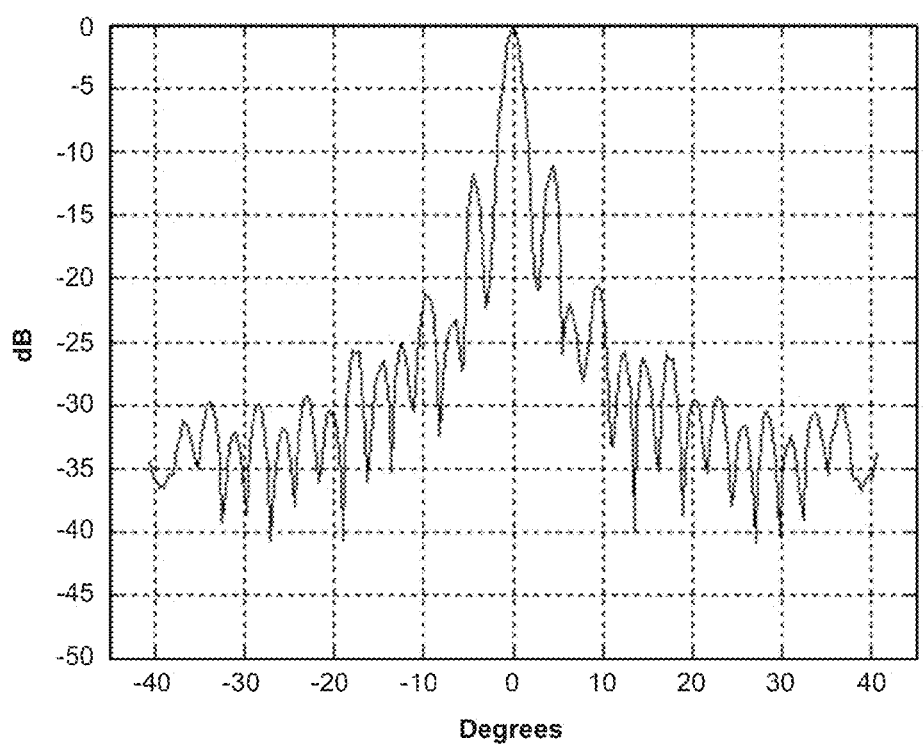
FIG. 8 illustrates the response of a PBF imaging system without DS (grating lobe cancellation ("GLC")) and with significant grating lobes.
Figure 9:
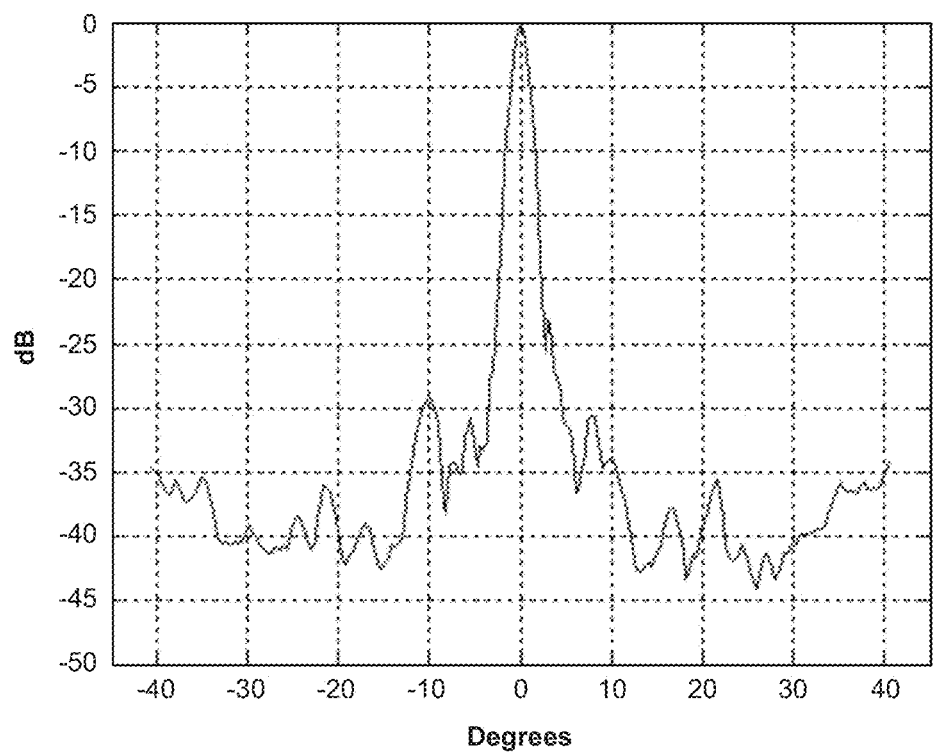
FIG. 9 illustrates the response of a PBF imaging system with DS (grating lobe cancellation) after each stage in the progressive beamformer in accordance with one embodiment of the disclosed technology.

An example of grating lobes without the digital stacking ("DS") summation is shown in FIG. 8. In this case, 96 MHz resolution in the beamforming was maintained for a Hanning window. The super element (SE) size in this case was 16. The grating lobes are quite effectively mitigated by employing the DS approach at each stage removing the many grating lobes arising from the various stages as seen in FIG. 9.

Figure 10:
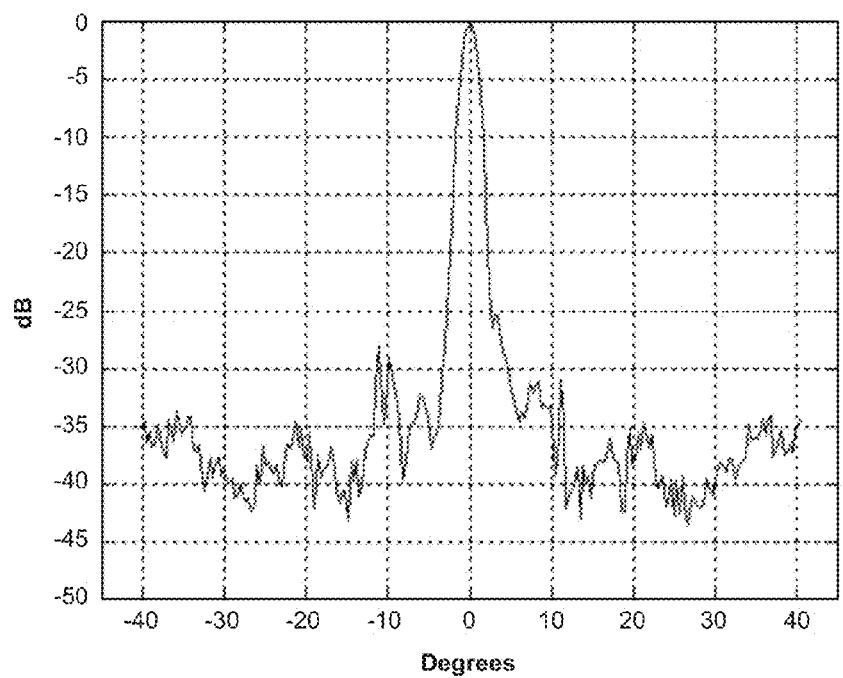
FIG. 10 illustrates the response using a conventional beamformer.

Comparing to the conventional beamforming method in FIG. 10, we find the differences are negligible.

Although the derivation above intimates a far field acoustic source, this effect also holds true for practical near field acoustic sources. The reason for this is that the DS solution makes use of the same effect (element spacing) as that which causes the grating lobes to begin with. That is, grating lobes caused by excessive spacing between delayed element centers can be mitigated by using elements having centers at half the distance. Although grating lobes are perfectly formed in context of plane waves from the far field, the same effect, though not as perfect, occurs with near field waves which are not generally planar. But even in this case, to the degree they are formed, they can also be mitigated.

Aperture Reclamation (AR) and Aggregate weighting imposed by DS.

The effect of the 1-2-1 DS operation from stage to stage is to impose a triangular weighting function on the aperture. Consider the weightings after the first stage of delays and the first GLC summation.

$se^{(2)}{}_0 = e_0 + 2e_1 + e_2$ $se^{(2)}{}_1 = e_2 + 2e_3 + e_4$ $se^{(2)}{}_2 = e_4 + 2e_5 + e_6$ $se^{(2)}{}_3 = e_6 + 2e_7 + e_8$ $se_{62}{}^{(2)} = e_{124} + 2e_{125} + e_{126}$

Note the superscript (2) indicates it is a super-element of size 2. The subscripts indicate the relative order of the element or super-element. So in the above equation, the 1-2-1 weighting is applied to the actual elements to create the super-elements of the next stage reducing the element count (e.g. from 127 elements to 63). Note that in these summations of the second stage super-elements there is a triangular weighting.

Now looking at the next stage of DS summation, we can write the following in terms of the original elements.

$se^{(4)}{}_0 = se^{(2)}{}_0 + 2se^{(2)}{}_1 + se^{(2)}{}_2 = (e_0 + 2e_1 + e_2) + 2(e_2 + 2e_3 + e_4) + (e_4 + 2e_5 + e_6) = e_0 + 2e_1 + 3e_2 + 4e_3 + 3e_4 + 2e_5 + e_6$ $se^{(4)}{}_1 = se^{(2)}{}_2 + 2se^{(2)}{}_3 + se^{(2)}{}_4 = (e_4 + 2e_5 + e_6) + 2(e_6 + 2e_7 + e_8) + (e_8 + 2e_9 + e_{10}) = e_4 + 2e_5 + 3e_6 + 4e_7 + 3e_8 + 2e_9 + e_{10}$ $se^{(4)}{}_2 = se^{(2)}{}_4 + 2se^{(2)}{}_5 + se^{(2)}{}_6 = (e_8 + 2e_9 + e_{10}) + 2(e_{10} + 2e_{11} + e_{12}) + (e_{12} + 2e_{13} + e_{14}) = e_8 + 2e_9 + 3e_{10} + 4e_{11} + 3e_{12} + 2e_{13} + e_{14}$ $se^{(4)}{}_{30} = se^{(2)}{}_{60} + 2se^{(2)}{}_{61} + se^{(2)}{}_{62} = (e_{120} + 2e_{121} + e_{122}) + 2(e_{122} + 2e_{123} + e_{124}) + (e_{124} + 2e_{125} + e_{126}) = e_{120} + 2e_{121} + 3e_{122} + 4e_{123} + 3e_{124} + 2e_{125} + e_{126}$

Note the triangular weighting in each of the above super-elements of size 4. This continues at each stage so that there are fewer super-elements expressed as triangular weighted sums of more original elements. This can be seen in FIG. 11 for the super-element of size 2. Note that the 1-2-1 summation creating a super-element is shown by the stacked arrangement of alternating shaded tiles. Looking up and down a column (identifying an original element) and adding up the number of times the same shade is used indicates the weighting for the particular original element. This results in 1-2-1 weighting for the elements contributing to the alternately shaded tiles. Note also that the arrows indicate the center of the super-element and that there are about half of them as the number of original elements.

Figure 11:
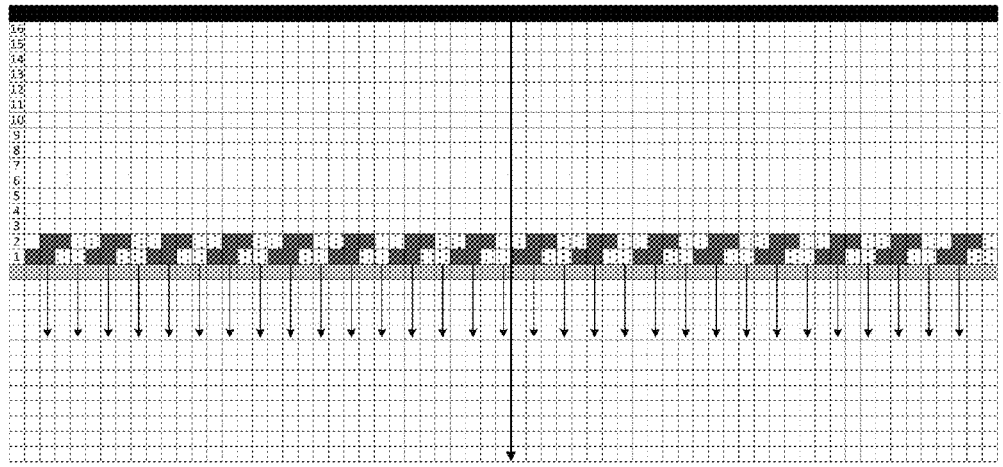
FIG. 11 illustrates an assembly of super elements at a first stage of a progressive beamformer with DS in accordance with one embodiment of the disclosed technology.
Figure 12:
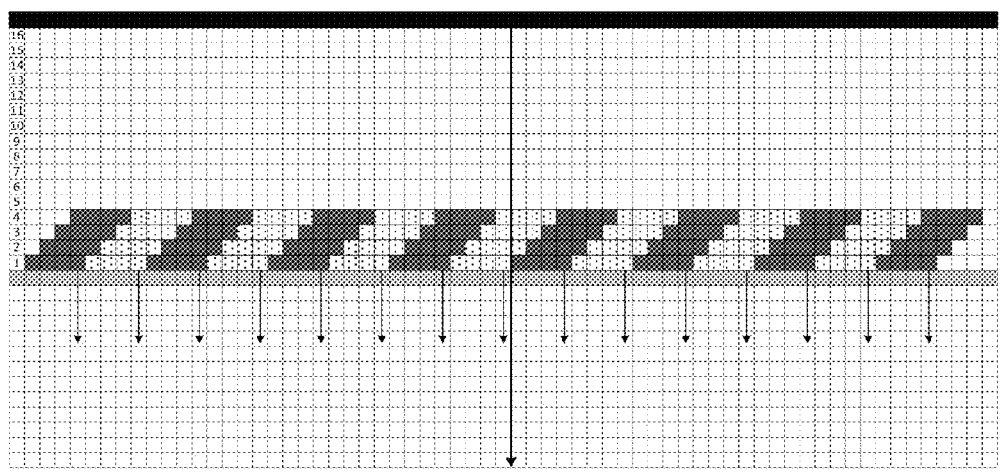
FIG. 12 illustrates an assembly of super elements at a second stage of a progressive beamformer with DS in accordance with one embodiment of the disclosed technology.

Similarly, the next stage is depicted in the FIG. 12 wherein there are about half as many arrows versus what is shown in FIG. 11, indicating about half as many super-elements that are twice as large. The alternating shaded tiles indicate the elements summed to make the size 4 super-elements. If we sum the number of occurrences of the same shade in a given column, we find the 1-2-3-4-3-2-1 weighting of the original elements contributing to the super-elements.

Figure 13:
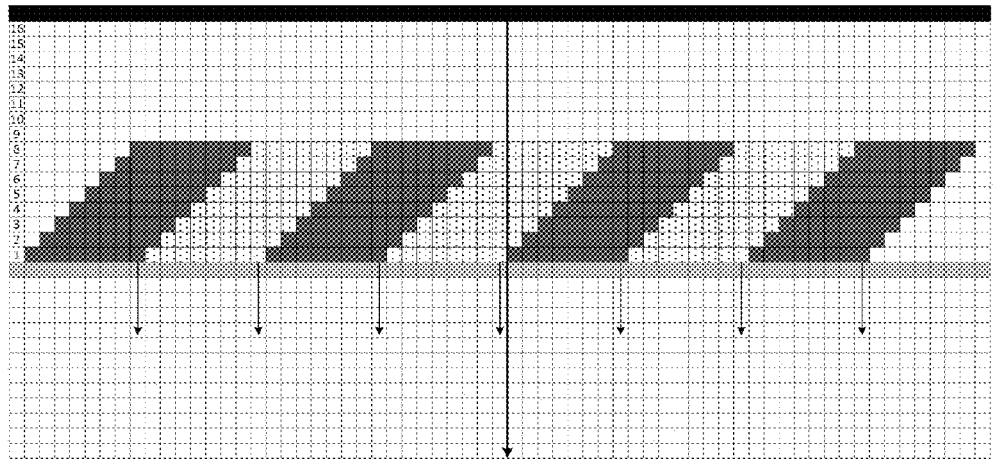
FIG. 13 illustrates an assembly of super elements at a third stage of a progressive beamformer with DS in accordance with one embodiment of the disclosed technology.

Continuing on to the size 8 super-element stage we find a larger triangle function as shown in FIG. 13.

Figure 14:
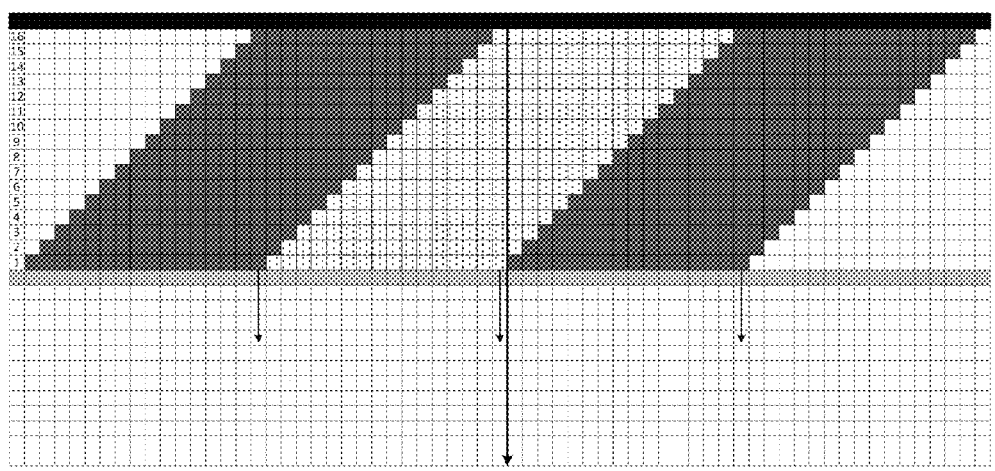
FIG. 14 illustrates an assembly of super elements at a fourth stage of a progressive beamformer with DS in accordance with one embodiment of the disclosed technology.

And finally, moving on to the size 16 super-elements we have a final beam sum that is created from these three super-elements as shown in FIG. 14. Here there will be a triangular weighting with the end elements being weighted less than the center ones, that is, the aperture is apodized.

Effect on Aperture Size

As is typical with aperture apodization, the effect of this aperture weighting function is to increase the beam width and lower side lobe levels. Although the slightly lower side lobe levels are desirable, the loss of main beam resolution is not generally a desired result.

Figure of Reclamation Parallelograms

Figure 15:
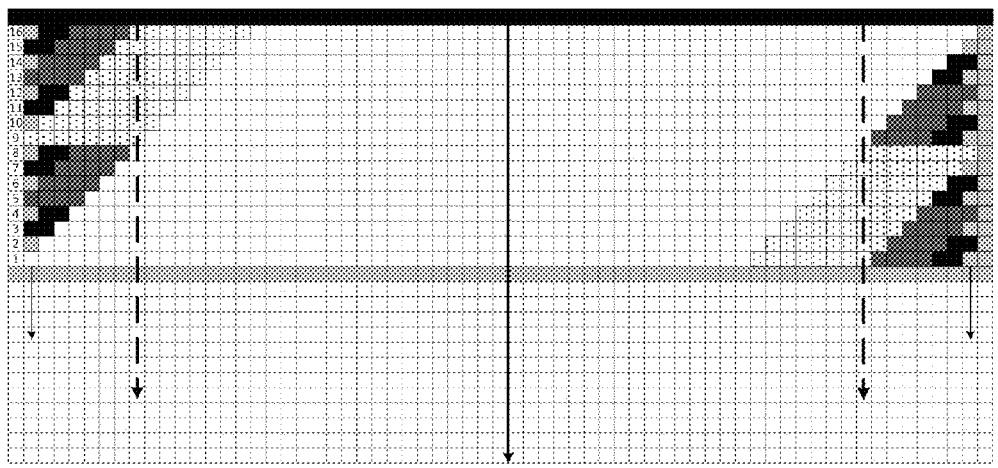
FIG. 15 illustrates an assembly of super elements at a reclamation stage of a progressive beamformer with DS in accordance with one embodiment of the disclosed technology.

In FIG. 14, there are white areas indicating a lack of weighting to end elements relative to the center elements. These are left over from the various DS operations. These can be reclaimed by creating partial super elements as shown in FIG. 15 in the form of shaded parallelograms that can be delayed and added to the various beams. In this way, a better resolution is created.

Similarity of Aperture Reclamation to Main Line Progressive Beam Forming

Figure 16:
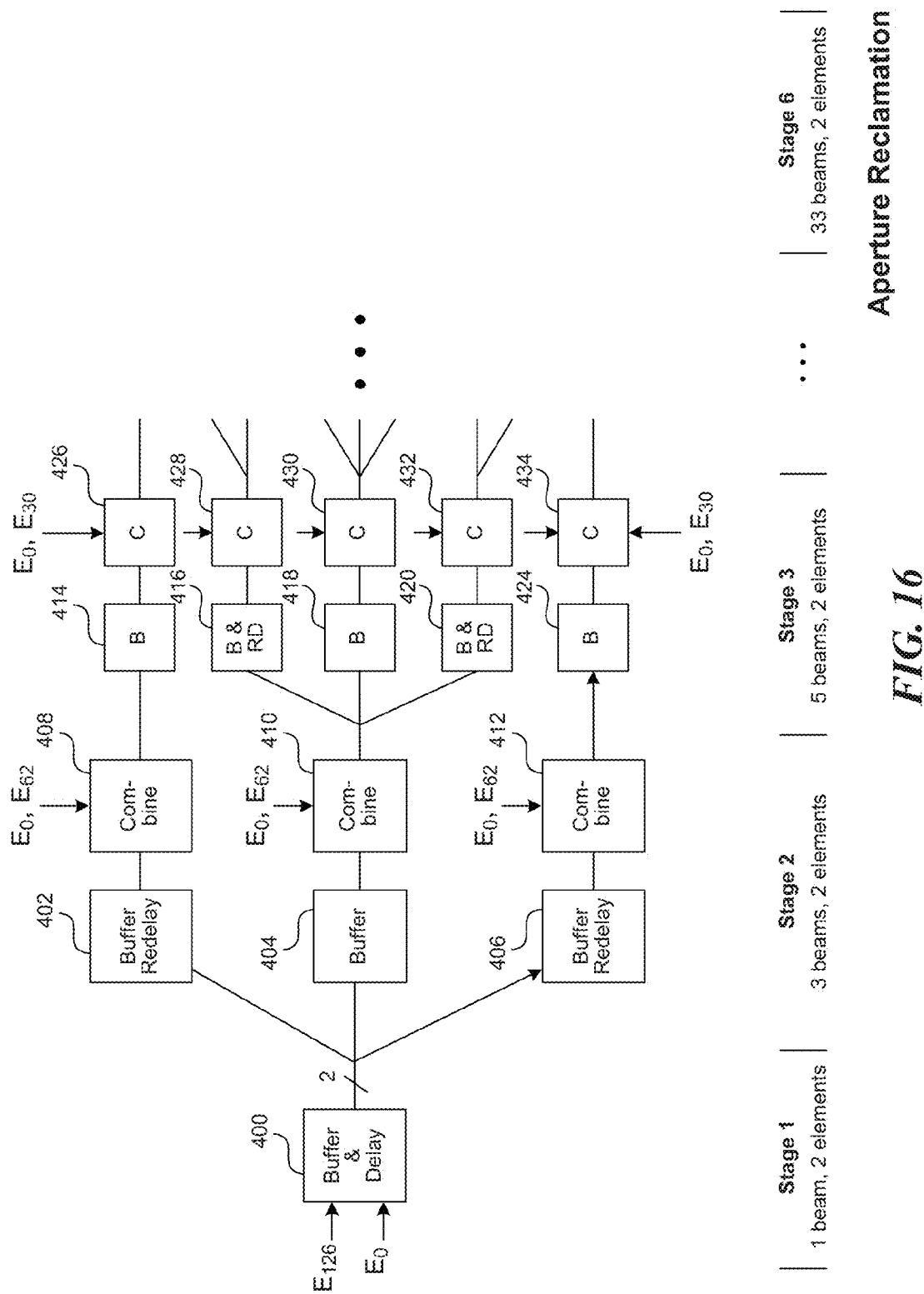
FIG. 16 illustrates a beam reclamation process in accordance with an embodiment of the disclosed technology.

This aperture reclamation process is performed in the same staged way as the mainline progressive beamforming process but with only data streams from the end elements of each stage. FIG. 16 illustrates how the contributions from the data streams from the end elements of each stage are reclaimed. Before the first DS operation in the mainline progressive beam forming process, the data streams from the two end elements $E_0$ and $E_{126}$ of the center beam are buffered at 400. The data from these steams are delayed to the center beamline. Next, the three streams focused on the center beamline are buffered at blocks 402, 404 and 406. In blocks 402 and 406, the data is re-delayed to focus the data on the outer beamlines. The data at the center block 404 doesn't need to be re-delayed because it is already focused on a point along the center beamline.

At blocks 408, 410 and 412 the focused stream data is combined with data from the corresponding stage in the mainline process. That is, the data streams at blocks 408, 410 and 412 are combined with the focused data streams from end $E_0$ and $E_{62}$ from block 320 shown in FIG. 3. The combination can be accomplished by a simple summing of the corresponding elements.

In the next stage of the aperture reclamation process, the data is supplied to the buffers 414, 416, 418, 420 and 424 where the data are either re-delayed to focus the data on a point on a new beamline or just buffered if the data are already focused. The data for each beamline is then combined with the corresponding mainline data that are focused. For example, block 426 combines the aperture reclamation data with the data streams $E_0$ and $E_{30}$ produced by block 360 shown in FIG. 3. The aperture reclamation data at block 432 is combined with the data streams $E_0$ and $E_{30}$ that are focused on an interior beamline produced by corresponding block 366 as shown in FIG. 3.

Figure 17:
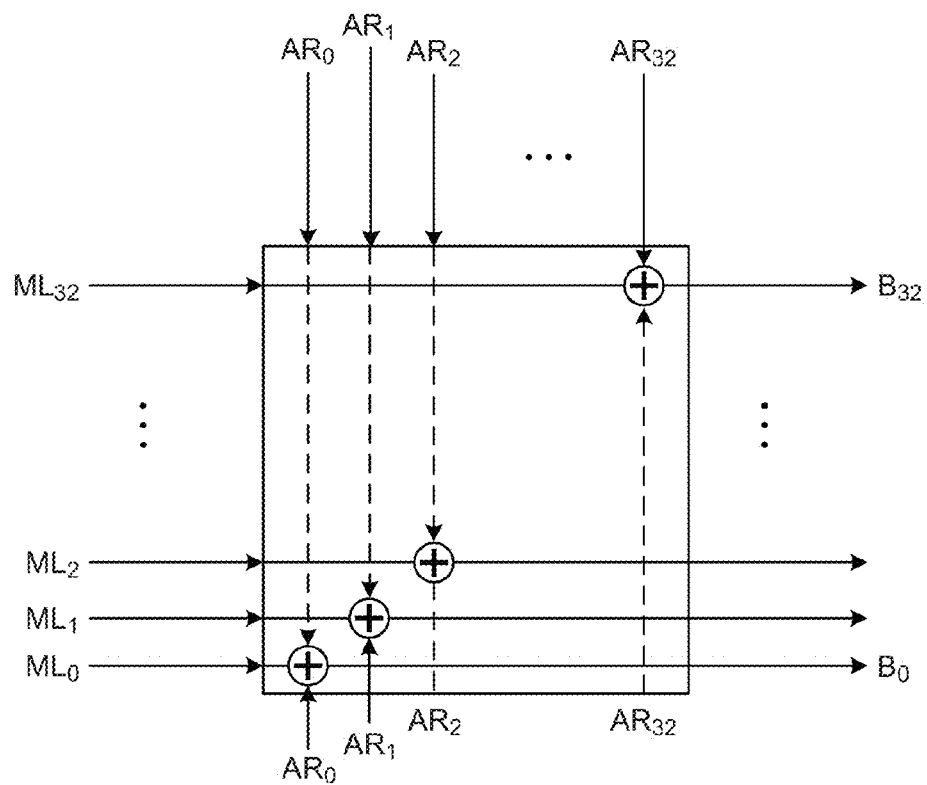
FIG. 17 illustrates how reclaimed beams are added to mainline beams in accordance with an embodiment of the disclosed technology.

Processing continues in this manner by adding the streams from the end elements of each stage in the mainline beamforming process to the data streams at each stage in the beam reclamation process. In one embodiment, when the data streams for all 33 beamlines are created in the beam reclamation process, the results are added back to the final result of the mainline progressive beamforming process as shown in FIG. 17 to produce the output beamlines. In one embodiment, the values from the mainline beamline process are simply added with the values from the aperture reclamation process. For example, the value represented by mainline beam $ML_0$ is added to the values in aperture reclamation line $AR_0$. At any stage in both the mainline and aperture reclamation process, the value for the beamline is computed by adding up the element values. In stage 4 of the mainline process shown in FIG. 3, the progressive beamformer calculates 9 beams with 7 elements each. The value for any beamline can be computed by adding together the values on each of the 7 elements. If the aperture reclamation is to be added back in at this stage, then the values of the 7 elements would be added to the 2 elements computed in the corresponding aperture reclamation stage. In this way, all the weighting of the end elements can be reclaimed. This reclamation process consumes a fraction of the processing that the main beam requires.

Data Streaming

In contrast to many beamforming schemes wherein a central memory is used at high bandwidth in the beamforming process, this approach needs only small amounts of distributed local memory (such as FIFOs or other suitable memories or electronic circuits) in sufficient depth to accommodate the delays required to receive the first sample to be used in a line. This, however, is not a restriction or limitation of this approach since element data can come either from the ADC devices or previously stored data in memory. In either case, memory bandwidth is kept to a minimum.

Delay Tables

Every delay block needs to be given the information on how to delay the incoming element to the proper locus of points (beamlines). This information is often stored as encoded tables. As beam density increases, the number of tables required also increases in proportion in conventional systems. However, this is not so with embodiments of the disclosed progressive beamformer. With the progressive beamformer, individual tables are only needed with widely varying delay curves. For example, in stage 2 and 3 of the progressive beamformer, only two tables per stage are needed with differing delay curves. However, in later stages that fill in more beamlines per stage, greater numbers of tables are used but the delay curves are nearly the same. As the bulk re-delay process is always relative to close neighboring beamlines, beamline delays all begin to converge to the same delay curve after a few stages. This is a tremendous advantage as the memory that stores delay information does not need to grow to a large size even when the line density becomes very fine.

In the forgoing discussion, a beamforming process has been described that can reduce by orders of magnitude the processing requirements for massive multi-line beamforming with little degradation to the image performance. This process makes progressive use of the beam formation process to make from one full set of elements delayed to a single line a large number of other lines in multiple stages—wherein at each stage the number of super elements is halved through DS and the number of beamlines is doubled through a bulk re-delay (BRD) process. The DS was required to suppress grating lobes at each stage. The DS produced a triangular apodization that reduced resolution which was easily corrected by the aperture reclamation (AR) process.

Exemplary Additional Applications

Computed Volume Sonography (CVS): This is an efficient way to implement CVS where beams are computed at points in space that correspond to pixels on a screen.

Scan Conversion: One additional application of this technology is that of scan conversion. For beam data from curved or phased arrays following a sampling grid based upon distance and angle, a fan of very closely spaced beams can be made. When beam spacing becomes sufficiently dense, one only needs to select the nearest beam sample to the desired pixel location.

For beam data acquisition that follows a Cartesian grid as in linear arrays, beam data may be computed to pixel locations directly or corresponding to a decimation of those pixel locations. That is, the beams are columns that may be either integer related to the pixel spacing or are fine enough density for a nearest neighbor approach. Thus, scan conversion can be accomplished fairly simply.

Analog Stacking (AS)

There is nothing in the method that mandates a digital system. Thus digital stacking performed in a digital system could be replaced in whole or in part by a similar procedure in the analog domain. This is particularly important in high element count arrays such as 2D arrays where some beamforming processes may be done in the analog domain.

2D & 1.X D Arrays: Arrays with significantly more elements such as 1.25D, 1.5D, 1.75D, or 2D arrays are particularly suited to this processing as the beam locations form a two dimensional grid allowing for a large number of beams to be generated in a small solid angle (as opposed to a simple lateral angle) with delays that are close to each other. In a full 2D array, the DS operation may be performed as a separable process of azimuth and elevation applications of the 1-2-1 weighting. In this way, the element count reduces by a factor of four at each stage, rapidly bringing channel counts down from 16384 (128×128 array) to 512 or 64 channels.

Large Elements without Grating Lobes: Moreover, the DS does not have to be done digitally; it can be done in analog domains especially within the scan head. Furthermore, there is no requirement that each DS must have a delay operator preceding it so that more than one GLC stage can be accomplished in either digital or analog domains prior to the delay stages so long as the super element directivity is consistent with the desired steered look directions.

Re-delaying from Lines Other than the Nearest Neighbor.

Given sufficient super element directivity, the nearest neighbor beams are not the only ones that could be used. Combinations of beams further away could also be used so long as the super element pattern supports it.

Apodization Alternatives

If an apodization function is desired, it can be applied at the first stage (before the DS summation) to control the main lobe and side lobes of all the resulting beams.

Alternatively apodization can be applied in later stages as well depending on the efficacy desired.

Synthetic Transmit Beamforming (STB)

Another extension to the PBF/DS approach is to incorporate synthetic transmit beamforming where multiple pings of one or more elements are made separately and the transmit beam formation occurs simultaneously with the receive beam formation. This is not hard to understand as the synthetic transmit contributors can be viewed as an additional factor on the element count.

Aberration Correction

Since beamforming delays and re-delays are based on the speed of sound in the same way as traditional beamforming schemes, aberration correction can applied in much the same way to this process in the computation of the delays just as it is done in traditional beamforming schemes.

Fast Color or Elastography

Fast Color or Elastography: Progressive Beam Forming can also be used with plane wave transmit and element acquisition systems using massive parallel processors. Such approaches are used to compute very high frame rate color or elastography images. The massive parallel beamforming of PBD/DS supports these imaging modalities.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor electronics" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored on a non-transitory computer readable media in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device. Non-transitory computer readable media devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the invention have been described herein for purposes of illustration, but that various modifications may be made without deviating from the spirit and scope of the invention. For example, the data streams could be weighted with a non-linear or other function to reduce the grating lobes. Accordingly, the invention is not to limited except as by the appended claims and equivalents thereof.

We claim:

1. An imaging system, comprising:
 a transducer for producing electrical signals in response to received echo signals;
 an analog to digital converter for producing corresponding digital signals;
 memory for buffering a number of data streams of signals produced by the analog to digital converter; and
 a number of stages, each including processor electronics operable to delay and combine at least a portion of data in the buffered data streams to align data to a point on a beamline within a field of view,
 wherein the processor electronics for stages after a first stage are operable to buffer and re-delay at least a portion of the data streams from a previous stage to align the data to a point on a new beamline, reduce the number of data streams that are aligned to a point on a beamline in a subsequent stage and increase an effective size of the transducer elements
 wherein the number of data streams is reduced in each stage by combining data streams using a weighted sum of neighboring data streams and the data streams are weighted with a weighting that is derived from a product of sines and cosines with arguments providing zeroes at grating lobe locations.

2. The imaging system of claim 1, wherein alternating data streams are weighted with a 1-2-1 weighting of adjacent data streams.

3. The imaging system of claim 1, wherein the combining is performed in the analog domain.

4. The imaging system of claim 1, wherein the combining is performed in the digital domain.

5. The imaging system of claim 1, wherein the reduction of the number of data streams for a subsequent stage results in fewer streams than every other stream.

6. The imaging system of claim 1, wherein each stage calculates data points for an increasing number of beamlines.

7. The imaging system of claim 1, wherein each stage calculates data points for increasingly larger element spacings.

8. The imaging system of claim 1, wherein each stage uses one or more delay tables to align the data streams on a beamline, wherein at least some of the delay tables are reused in later stages of the progressive beamformer.

9. The imaging system of claim 1, wherein the signals in the data streams are acoustic signals.

10. The imaging system of claim 1, wherein the signals in the data stream are electromagnetic signals.

11. A progressive beamforming system, including:
 a transducer for producing electrical signals in response to received echo signals;
 an analog to digital converter for producing corresponding digital signals;
 a series of stages including a first stage and a number of subsequent stages,
 wherein the first stage includes processor electronics that are configured to receive a number of data streams from the analog to digital converter that represent signals from a field of view,
 wherein the processor electronics are configured to delay the data streams to align the data streams to a point of interest on a first beamline and to reduce the number of data streams by combining data streams using a weighted sum of neighboring data streams and the data streams are weighted with a weighting that is derived from a product of sines and cosines with arguments providing zeroes at grating lobe locations;
 wherein subsequent stages include processor electronics that are configured to receive data streams from a previous stage and to re-delay the received data streams to align the data streams to a point of interest on a new beamline and to reduce the number of data streams that are aligned to a point on a beamline in a subsequent stage.

12. The progressive beamforming system of claim 11, wherein each stage reduces the number of data streams by weighting selected data streams with a weight that is greater amount than a weight applied to adjacent data streams and summing the data stream with its adjacent data streams.

13. The progressive beamforming system of claim 11, wherein selected data stream are weighted with a weight that is twice the weight of its adjacent data streams.

14. The progressive beamforming system of claim 11, wherein the beamlines produced are part of a mainline beamforming process and the system further includes a number of beam reclamation stages that receive data streams from a previous stage, buffer and re-delay the data streams to a new beam line and to add streams from end elements of a corresponding stage in the mainline beamforming process in order to produce a reclaimed beamline that is added back to a beamline produced in the mainline beamforming process in order to produce an output beamline.

15. A beamformer comprising:
- a transducer for producing electrical signals in response to received echo signals;
- an analog to digital converter for producing corresponding digital signals;
- a mainline progressive beamformer that is configured to delay digital signals from the analog to digital converter to focus the signals on a point of interest on a number of beamlines,
  wherein the mainline beamformer operates to re-delay stored signals that are focused on one beamline in order to focus the digital signals
  on a new beamline by combining data streams using a weighted sum of neighboring data streams and the data streams are weighted with a weighting that is derived from a product of sines and cosines with arguments providing zeroes at grating lobe locations; and
- an aperture reclamation beamformer that is configured to delay signals from end elements of a transducer and combine them with delayed signals from the mainline progressive beamformer in order to produce data for a point on a beamline.

16. The beamformer of claim 15, wherein the mainline progressive beamformer is arranged in a number of stages, wherein each stage adds data for new beamlines.

17. The beamformer of claim 16, wherein each stage after a 2nd stage is configured to add data for beamlines that are interleaved with data for previously computed beamlines.

* * * * *